(12) United States Patent
Sirrenberg et al.

(10) Patent No.: US 9,327,653 B2
(45) Date of Patent: May 3, 2016

(54) ROOF RAIL FOR A MOTOR VEHICLE

(71) Applicants: Stefan Sirrenberg, Wuppertal (DE); Hans Binder, Böhmenkirch (DE); Ottmar Binder, Böhmenkirch (DE)

(72) Inventors: Stefan Sirrenberg, Wuppertal (DE); Hans Binder, Böhmenkirch (DE); Ottmar Binder, Böhmenkirch (DE)

(73) Assignee: HANS UND OTTMAR BINDER GMBH OBERFLÄCHENVEREDELUNG (DE)

( * ) Notice: Subject to any disclaimer, the term of this patent is extended or adjusted under 35 U.S.C. 154(b) by 49 days.

(21) Appl. No.: 14/372,426

(22) PCT Filed: Jan. 10, 2013

(86) PCT No.: PCT/EP2013/050389
§ 371 (c)(1),
(2) Date: Jul. 15, 2014

(87) PCT Pub. No.: WO2013/107683
PCT Pub. Date: Jul. 25, 2013

(65) Prior Publication Data
US 2014/0353350 A1    Dec. 4, 2014

(30) Foreign Application Priority Data

Jan. 17, 2012  (DE) .................... 20 2012 000 436 U

(51) Int. Cl.
*B60R 9/052* (2006.01)
*B60R 9/04* (2006.01)

(52) U.S. Cl.
CPC ........................................ *B60R 9/04* (2013.01)

(58) Field of Classification Search
CPC ............ B60R 9/04; B60R 9/052; B60R 9/058
See application file for complete search history.

(56) References Cited

U.S. PATENT DOCUMENTS 3,826,390 A * 7/1974 Watson ................. B60R 9/0423
                                                       224/310
5,137,195 A * 8/1992 Walter ................... B60R 9/058
                                                       224/315

(Continued)

FOREIGN PATENT DOCUMENTS

DE   20 2011 001621 U1    3/2011
EP      0 657 324 A1       6/1995

(Continued)

OTHER PUBLICATIONS

International Search Report dated Mar. 15, 2013 issued in corresponding International Patent Application No. PCT/EP2013/050389.

(Continued)

*Primary Examiner* — Brian D Nash
(74) *Attorney, Agent, or Firm* — Ostrolenk Faber LLP

(57) ABSTRACT

A roof rail (1) for a motor vehicle, having at least one rack bar (3) and having at least one support element (24) which is fixed to the rack bar (3) for bridging a spacing which is formed between the rack bar (3) and the roof of the motor vehicle and for fixing the roof rail (1) to the roof of the motor vehicle, and having at least one cover (11) for the support element (24), wherein the rack bar (3), support element (24) and cover (11) are formed as separate components. There is provision for at least one end region (6) of the rack bar (3) to be in the form of a bent portion (7) whose front end (8) forms a roof application end (9), for the support element (24) to be in the form of an extrusion component (56) and for the support element (24) and cover (11) to be located at least partially in the region of the bent portion (7).

17 Claims, 14 Drawing Sheets

(56) References Cited

U.S. PATENT DOCUMENTS

| | | | | |
|---|---|---|---|---|
| 5,306,156 | A * | 4/1994 | Gibbs | B60Q 1/302 224/315 |
| 2010/0084448 | A1 * | 4/2010 | Fjelland | B60R 9/058 224/322 |
| 2010/0147914 | A1 * | 6/2010 | Sautter | B60R 9/055 224/325 |
| 2013/0037585 | A1 * | 2/2013 | Hubbard | B60R 9/045 224/324 |
| 2013/0062379 | A1 * | 3/2013 | Sautter | B60R 9/10 224/324 |
| 2014/0124551 | A1 * | 5/2014 | Condon | B60R 9/048 224/324 |
| 2014/0143990 | A1 * | 5/2014 | Sautter | B60R 9/052 24/68 CD |

FOREIGN PATENT DOCUMENTS

| | | |
|---|---|---|
| EP | 0 689 965 A1 | 1/1996 |
| JP | 2007 253928 | 10/2007 |
| JP | 2009 298230 | 12/2009 |
| WO | WO 2005/049379 A1 | 6/2005 |
| WO | WO 2007/104388 A2 | 9/2007 |

OTHER PUBLICATIONS

International Preliminary Report on Patentability dated Jan. 16, 2014 issued in corresponding International Patent Application No. PCT/EP2013/050389.

* cited by examiner

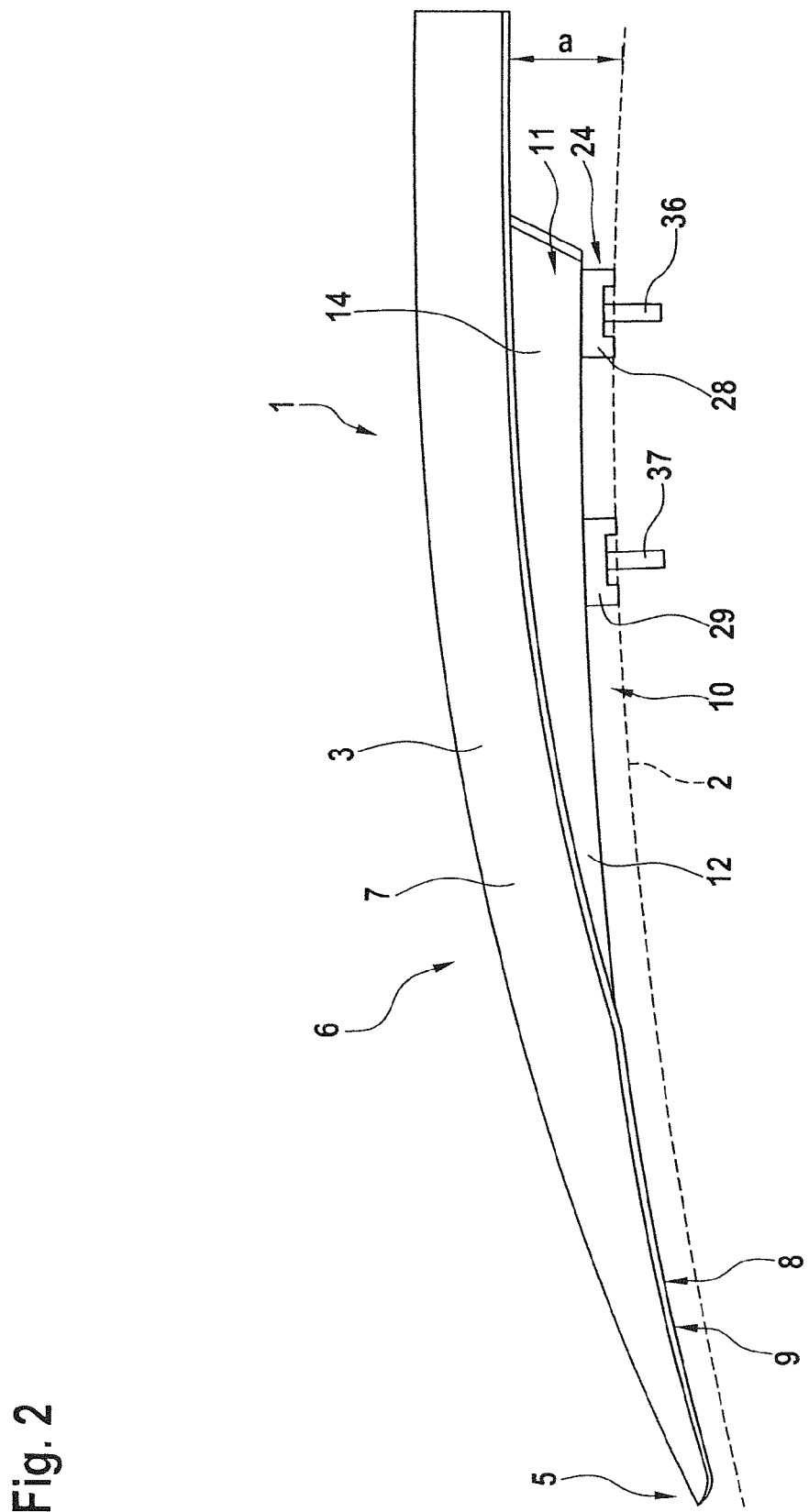

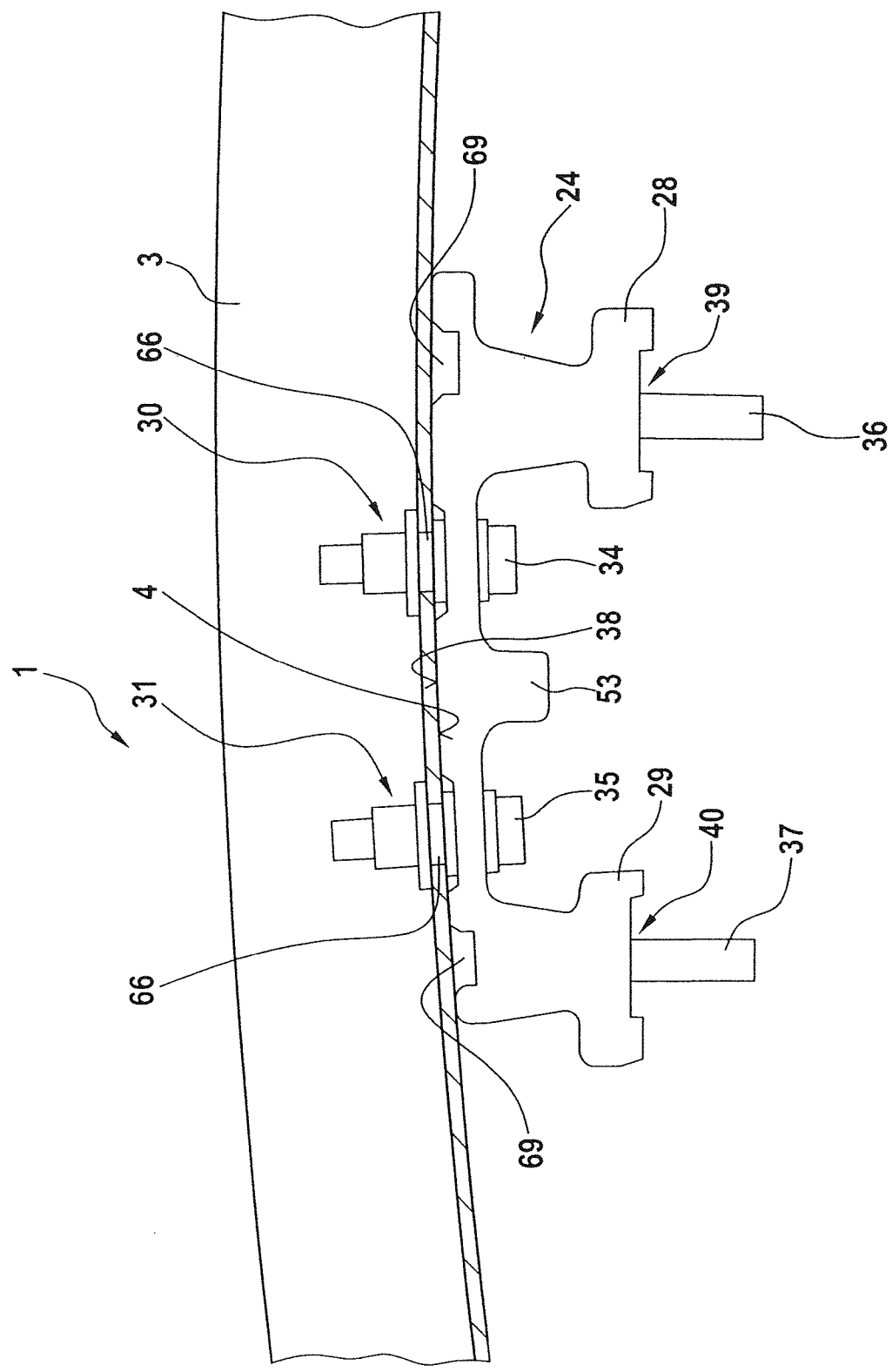

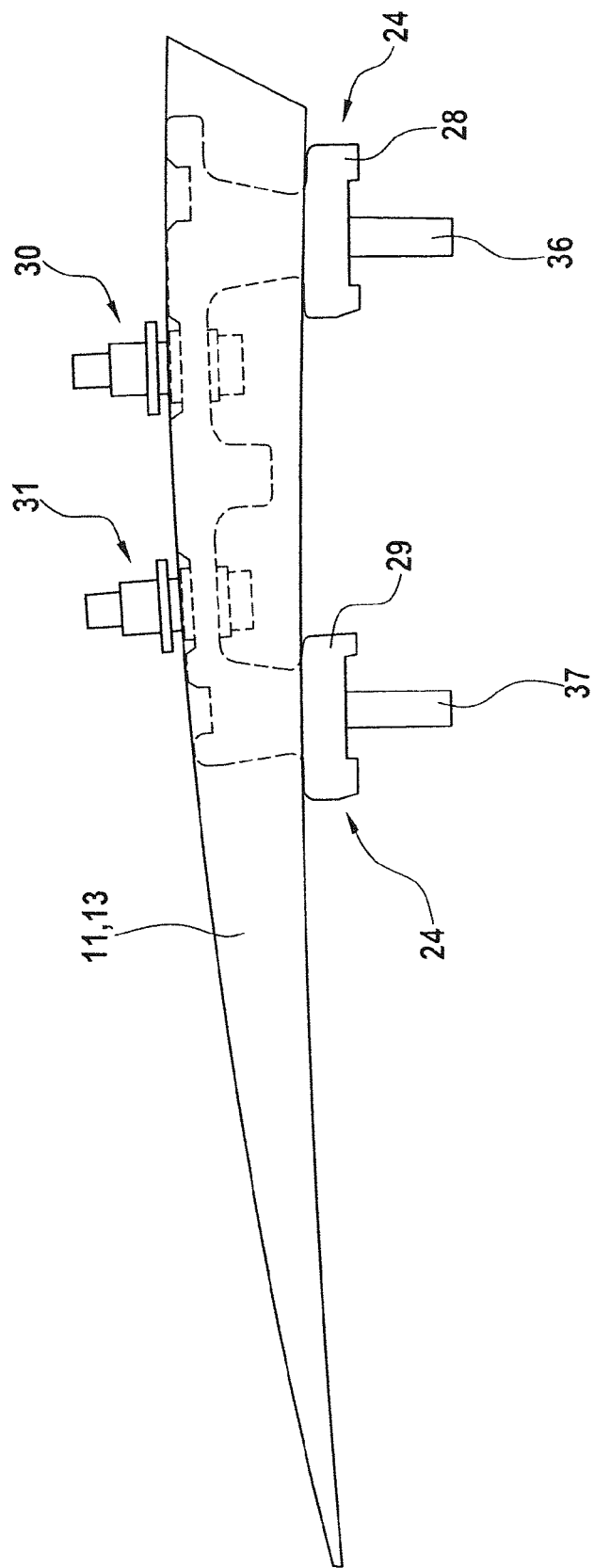

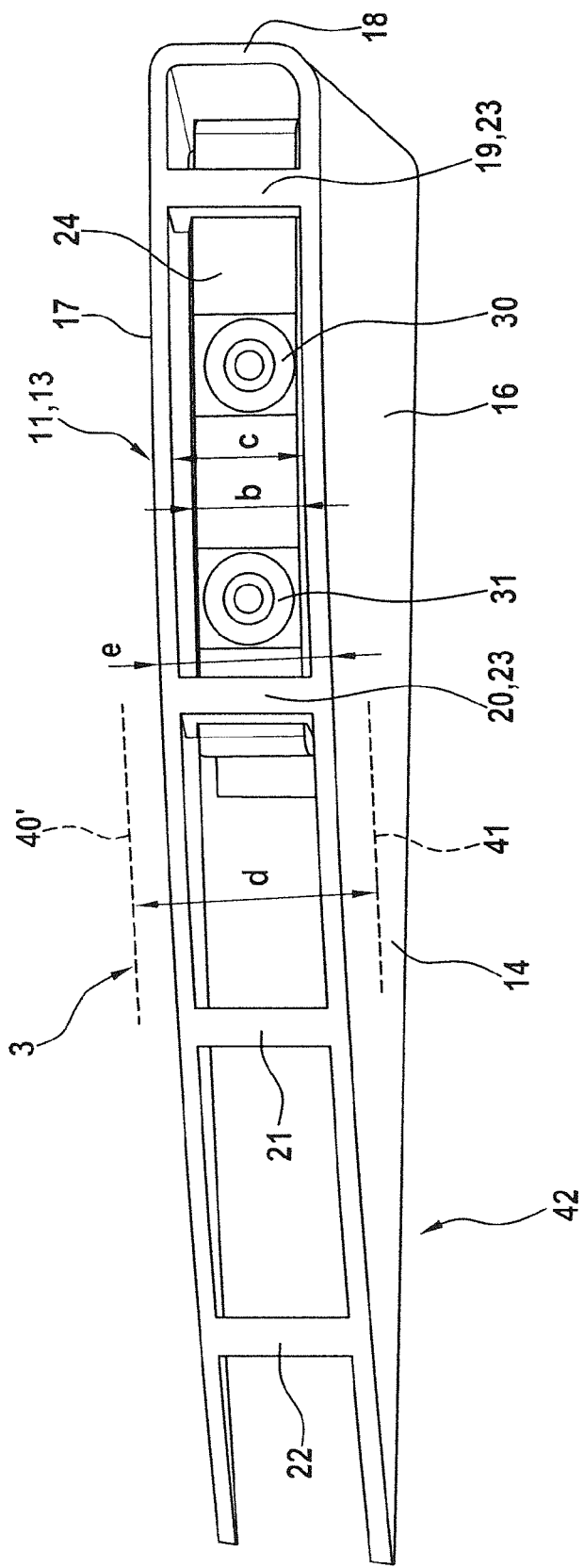

ROOF RAIL FOR A MOTOR VEHICLE

CROSS REFERENCE TO RELATED APPLICATIONS

The present application is a 35 U.S.C. §371 National Phase conversion of PCT/EP2013/050389, filed Jan. 10, 2013, which claims benefit of German Application No. 20 2012 000 436.0, filed Jan. 17, 2012, the disclosure of which is incorporated herein by reference. The PCT International Application was published in the German language.

TECHNICAL FIELD OF THE INVENTION

The invention relates to a roof rail for a motor vehicle, having at least one rack bar and having at least one support element which is fixed to the rack bar for bridging a spacing which is formed between the rack bar and the roof of the motor vehicle and for fixing the roof rail to the roof of the motor vehicle, and having at least one cover for the support element, wherein the rack bar, support element and cover are formed as separate components.

BACKGROUND OF THE INVENTION

A roof rail for a motor vehicle may be constructed in different manners according to the prior art. For instance, on the one hand, there are systems which are positioned flat on the roof of the motor vehicle and in which the lower side of a rack bar of the roof rail is positioned directly (or with a thin plastics film being interposed) on the vehicle roof or, on the other hand, systems in which the rack bar extends completely or predominantly with spacing from the vehicle roof. In the latter case, support elements which bring about this spacing are necessary. The roof rail according to the invention involves the last-mentioned case, that is to say, at least one rack bar which extends—over the length thereof—predominantly with spacing from the vehicle roof. Those systems according to the invention may also be referred to as "upright systems".

In known upright systems, a majority of the extent of the lower side of the at least one rack bar retains a clearly visible, desired spacing from the vehicle roof, this spacing being produced by at least one support element which produces a non-positive-locking connection with respect to the motor vehicle. Such a support element is therefore visible and often reasonably heavy, that is to say, the weight of the roof rail is decisively influenced by the weight of the support element. Furthermore, such support elements are often provided with a cover in order, for example, to adapt a support element produced as a forged component to the visual appearance of the rack bar by means of the cover, that is to say, the cover has a surface which is adapted to the surface of the rack bar to the greatest possible extent. That adaptation is often unsatisfactory but better than using no cover at all because the forged component mentioned conveys a completely different visual impression from that of the rack bar which is particularly produced using the extrusion method. The known cover is often clip-fitted to the support element, that clip-fitting tending to loosen itself, for example, in the event of unfavorable application of forces.

SUMMARY OF THE INVENTION

An object of the invention is therefore to provide a roof rail of the type mentioned in the introduction in which a visually very appealing configuration of the individual components is present, which is lightweight and can be produced in a cost-effective manner. A strong and secure cohesion of all the components is further intended to be provided.

This object is achieved according to the invention in that at least one end region of the rack bar is in the form of a bent portion whose front end forms a roof application end, in that the support element is in the form of an extrusion component and in that the support element and cover are located at least partially in the region of the bent portion. The formation of the support element as an extrusion component can be brought about in a simple and cost-effective manner and such a component is of light weight. The arrangement of the support element and cover in the region of the bent portion is visually appealing and favorable for the secure fixing of the roof rail to the vehicle.

It is further advantageous for a spandrel to be formed between the end region of the rack bar and a roof contour line of the roof and for the cover to be in the form of a spandrel cover which extends as far as a location in a spandrel tip. In particular, the cover has an approximately triangular contour in a side view of the roof rail.

It is further advantageous for the cover to have at least one fixing region which is retained in order to fix the cover in a gap formed between the rack bar and the support element. Consequently, at least one region of the cover according to the invention forms the fixing region. That region must be retained in order to fix the cover. That retention is produced according to the invention in that there is formed between the rack bar and the support element a gap in which the fixing region is retained. That retention may particularly be brought about by clamping action and/or by positive-locking action. Since the retention of the fixing region is brought about in the gap, no other fixing means such as, for example, clip-fit fixing means, are necessary, but instead it is sufficient to arrange the fixing region in that gap. Since it is between the components, the rack bar and support element, the cover is retained in a non-releasable manner since the gap is closed, on the one hand, by a portion of the rack bar and, on the other hand, by a portion of the support element. As a result, a very simple, cost-effective and also secure fixing of the cover is provided.

According to a development of the invention, there is provision for the fixing region to be retained in the gap between the rack bar and the support element only by guiding together those components, which guiding is carried out to fix those components to each other. The function of the support element is to retain the rack bar with spacing from the vehicle roof and to allow fixing to the motor vehicle. Accordingly, the support element has to be connected to the rack bar. During this connection, the rack bar and the support element are guided together, in particular until they touch each other, and then fixed to each other by suitable means, for example, by means of a screwed connection. The arrangement is now brought about in such a manner that the fixing region of the cover is arranged between the rack bar and support element when those components are guided together, that is, in the gap mentioned, so that the fixing region is in the gap in the guided-together state of the components mentioned and is retained therein, in particular by a clamping action which is produced in that the rack bar and support element are clamped toward each other, for example, by the screwed connection mentioned, and the fixing region is thereby clamped.

There is in particular provision for the retention of the fixing region brought about in the gap to be carried out without fixing means, that is to say, besides the fixing region being retained in the gap, no other element, for example, a screwed or clip-fit connection, is present in order to fix the cover.

A development of the invention makes provision for the retention of the fixing region brought about in the gap to be carried out by a positive-locking action and/or by a clamping action which is present between the rack bar and the support element. The clamping action has already been discussed above. The positive-locking action is brought about in that the fixing region is secured in the gap which is closed upward, downward, forward and backward. The gap is open only at the two sides of the gap, that is to say, toward the right and left—when viewed in the direction of the longitudinal extent of the rack bar—wherein the fixing region mentioned protrudes here and extends to the actual cover element of the cover so that it is also not possible for the fixing region to slip out of the gap to the right or left because the cover element covers the support element at least at both sides.

According to a development of the invention, there is provision for the rack bar to be supported directly on the support element at least at one location beside the gap. That supporting action is carried out in the direction in which the components mentioned are guided together, in particular the tensioning direction thereof. In this embodiment, therefore, there is provision for the components, rack bar and support element, which are fixed to each other also to adjoin each other at least at one location. Alternatively, it is also conceivable for the components mentioned not to adjoin each other but instead for them to clamp the fixing region of the cover between them and thereby to retain the cover and, furthermore, also to be thereby fixed to each other—with the fixing region being interposed. In the first case mentioned, it is conceivable for the fixing region to be received in the gap between the rack bar and the support element in a clamping manner and for the rack bar and support element to be supported on each other with that fixing region being interposed, and for a direct supporting action of the rack bar and support element to be provided at the mentioned at least one location beside the gap.

A development of the invention makes provision for the gap to be formed by at least one peripherally open recess of the rack bar and/or support element. Thus, the recess may be formed only in the support element, only in the rack bar or also in both components, that is to say, one region of the gap is formed by the recess of the rack bar and another region of the gap is formed by the recess of the support element. If the rack bar and support element are mounted together, the entire gap is formed.

As mentioned, there is provision for at least one end region of the rack bar to be in the form of a bent portion whose front end forms a roof application end. That end region extends in a curved manner, whereby the spacing of the rack bar moves increasingly toward the vehicle roof as a result of the bending in such a manner that at the end side the front end of the rack bar is positioned on the vehicle roof—optionally with a spacer being interposed on the vehicle roof. Consequently, the support element is preferably located with spacing from the application location.

There may particularly be provision for the rack bar, support element and/or cover each to be constructed integrally. Alternatively, it is also possible for the rack bar to comprise a plurality of part-pieces.

As mentioned, the support element is in the form of an extrusion member or extrusion component. It is particularly preferable for the rack bar and/or cover to be in the form of an extrusion component. A very simple production operation is thereby achieved and it is particularly possible for those components to have the same surface structure. Thus, for example, all three may comprise an aluminum alloy, wherein the surface of the rack bar and the cover are processed in the same manner, for example, polished, and thereby one and the same visual effect is achieved, that is to say, the components of the roof rail cooperate in a visually harmonious manner with color matching. The construction of the support element as an extrusion component further has the advantage that it can be constructed so as to be very light and therefore only has a low weight which is particularly the case when the width of the support element in the form of an extrusion component is narrower than the width of the rack bar, wherein the cover which is at both sides of the support element preferably has a width which is also smaller than the width of the rack bar. Consequently, the width of the support element is even smaller than the width of the cover because the support element is arranged inside the cover. Consequently, a very narrow support element is involved because it is inside the cover, that is to say, at both sides the wall thicknesses of the cover have to be considered, wherein the cover is smaller than the width of the rack bar with regard to the outside dimension thereof with respect to the width. This results in a light and visually receding configuration of the fixing system of the rack bar, which fixing system is particularly arranged only in the spandrel region. This does not prevent the use of at least one central support for retaining and supporting the rack bar.

According to a development of the invention, there is provision for the rack bar and/or cover each to be formed as an injection-molded component and/or as a diecast component and/or for the cover to be in the form of an injection-molded plastics component.

In addition to the above-mentioned possibility of configuring the rack bar, support element and/or cover as an extrusion component(s), therefore, there are also other known production possibilities for those components.

It is further advantageous for the rack bar, support element and/or cover each to comprise aluminum or an aluminum alloy. One and the same visual impression is thereby achieved for the components. This further results in a durable, corrosion-free and light construction.

A development of the invention makes provision for the fixing of the support element to the rack bar to be brought about by means of at least one screwed connection. If the screwed connection is tightened, the support element and rack bar move toward each other, wherein the fixing region of the cover in the gap is retained as soon as the components are screwed together.

It is further advantageous for the rack bar, support element and/or cover each to be in the form of a hollow profile-member. That saves weight and material and therefore costs. The construction of the rack bar as a hollow profile-member further makes it possible for simple fixing means to be able to be introduced inside the rack bar in order to be able to carry out the fixing of the support element to the rack bar.

According to an embodiment of the invention, there is preferably provision for the screwed connection to have a rivet nut, in particular a rivet nut which is riveted by tightening the screwed connection and which is associated with the rack bar, and for the support element to have at least one fixing hole, through which a threaded screw which is screwed into the rivet nut extends. The rivet nut is introduced into a hole at the lower side of the rack bar with a fixing region until a collar of the rivet nut adjoins the lower side of the rack bar. The threaded screw is now fitted through the fixing hole of the support element and screwed into the rivet nut. If the components, the support element and rack bar, are now screwed together by tightening the screwed connection, the rivet nut forms a bead inside the rack bar which is in the form of a hollow profile-member by the screwed connection being tightened by means of deformation of the fixing region of the rivet nut. That bead forms a flange which forms a counter-bearing for the collar, that is to say, the wall thickness of the rack bar is received between the flange and collar. As a result, the rivet nut is riveted to the rack bar, and the support element and rack bar are securely clamped to each other by the screwed connection being tightened. Alternatively, the riveting of the rivet nut may also be carried out with a special riveting device and the screwing of the rack bar and support element can then be carried out.

A development of the invention makes provision for a preferably separate, in particular plate-like base element to be associated with the cover. That base element may optionally be present. If it is present, it is preferably used to fix the spacer mentioned which is or may be located between the vehicle roof and the roof rail.

There may particularly be provision for the base element to have at least one opening through which at least one foot of the support element extends. The foot serves to fix the roof rail to the vehicle.

A development of the invention makes provision for the base element to be retained on the cover by means of a clip-fit action and/or clamping action. The cover is preferably located—when viewed in the longitudinal extent of the rack bar—at both sides of the support element and also at the front side of the support element, which side faces away from the roof application end of the rack bar. It is consequently—when viewed as a longitudinal section—of U-shaped form. In order to bring about retention of the base element on the cover, the mentioned clamping and/or mentioned clip-fitting may be carried out. Thus, it is particularly possible to clamp the base element between the inner sides of the cover or the base element has an upright peripheral edge which is supported on the outer sides of the cover and is retained at that location by a clamping action. Additionally or alternatively, the clip-fitting action is possible. In the first case mentioned, the base element cannot be seen from the outer side because it is received inside the cover in a non-releasable manner; in the second case, the mentioned peripheral edge can be seen from the outer side and is also arranged in a non-releasable manner between the cover and the vehicle roof.

A method for fixing a cover of a roof rail, in particular of a roof rail as described above, for a motor vehicle is further advantageous, wherein the roof rail has at least one rack bar, at least one support element fixed to the rack bar and at least the cover, and the support element is used for bridging a spacing formed between the rack bar and the roof of the motor vehicle and for fixing the roof rail to the roof of the motor vehicle, and the support element is covered with the cover, wherein the rack bar, support element and cover are formed as separate components, and wherein at least one fixing region is formed on the cover and is retained in a gap formed between the rack bar and support element in order to fix the cover.

There is further provision in particular for the fixing region to be retained in the gap between the rack bar and support element only by those components being guided together, which guiding is carried out in order to fix those components to each other.

BRIEF DESCRIPTION OF THE DRAWINGS

The drawings illustrate the invention with reference to embodiments. In the drawings:

FIG. 2 is a side view of the roof rail in the end region in the assembled state, FIG. 3 is a detailed view of the roof rail in the fixing region without a cover being illustrated, FIG. 4 is an illustration corresponding to FIG. 3 but with the cover and without a rack bar, FIG. 5 is a view from above of the support element and the cover of the roof rail.

DESCRIPTION OF EMBODIMENTS

Figure 1A:
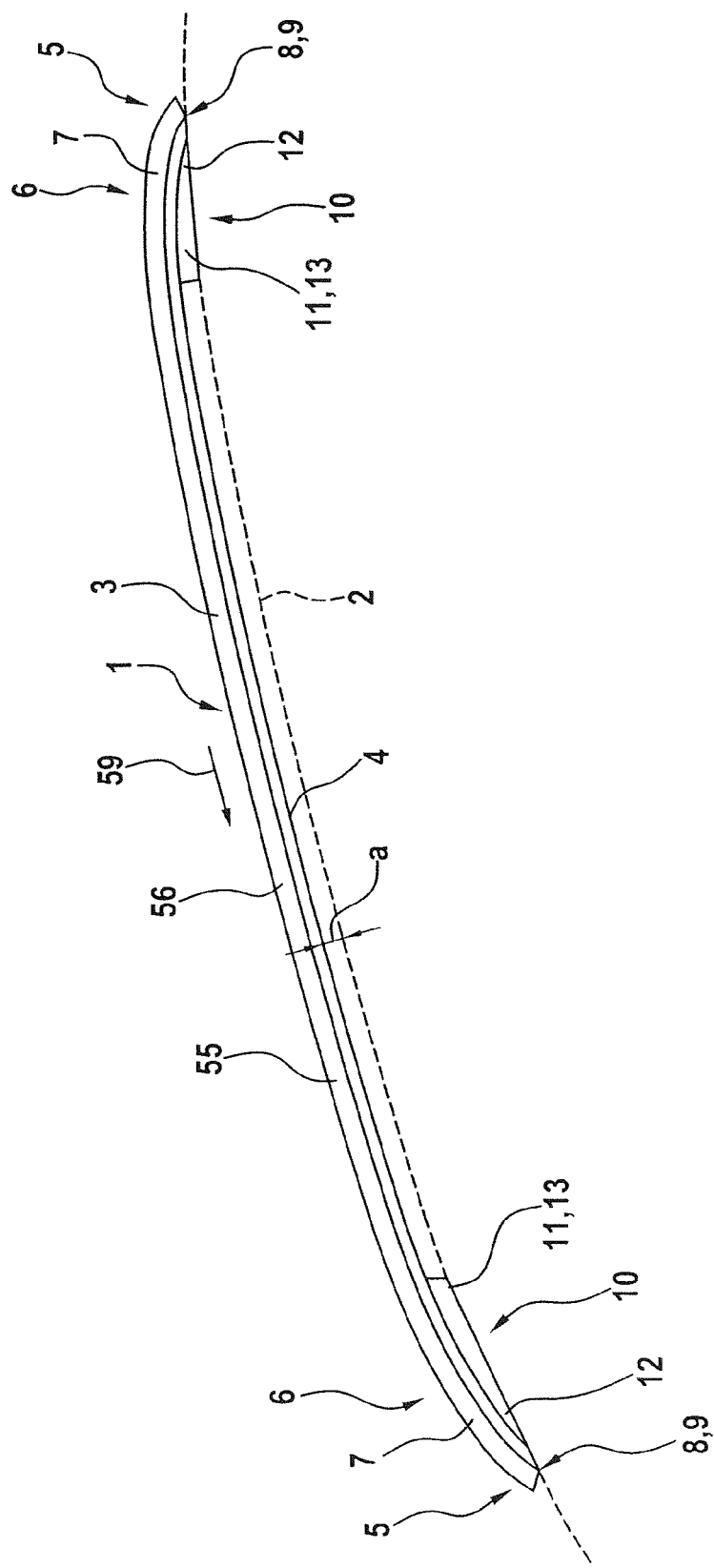
FIG. 1a is a perspective view of a roof rail for a motor vehicle.

FIG. 1a is a perspective view of a roof rail 1 for a motor vehicle. Of the motor vehicle, only a broken roof contour line 2 of the roof of the motor vehicle is illustrated. It can be seen that a rack bar 3 of the roof rail 1 extends with a spacing a from the roof contour line 2, that is to say, the lower side 4 of the rack bar 3 is not positioned on the roof of the vehicle but instead retains the spacing a. Only the two ends 5 of the rack bar 3 extend as far as the roof contour line 2, that is to say, they are positioned on the roof of the motor vehicle—optionally with a spacer (not illustrated) being interposed. In order to achieve this positioning, the end regions 6 of the rack bar 3 are in the form of bent portions 7 so that the front ends 8 form roof application ends 9, that is to say, the front ends 8 are located in the roof contour line 2 and are therefore positioned on the roof of the motor vehicle. A substantially triangular spandrel 10 is formed between the roof contour line 2 and the lower side 4 of the rack bar 3 in the end regions 6. A support element 24 for bridging a spacing formed between the rack bar 3 and the roof of the motor vehicle and for fixing the roof rail 1 to the roof of the motor vehicle is located in the spandrel 10, respectively. The respective support element 24 cannot be seen in FIG. 1a because it is covered by a cover 11. Since the cover 11 extends as far as a location in the spandrel tip 12 of the spandrel 10, a spandrel cover 13 is involved. In this regard, the cover 11 has—when viewed in a side view—an approximately triangular contour.

Figure 1B:
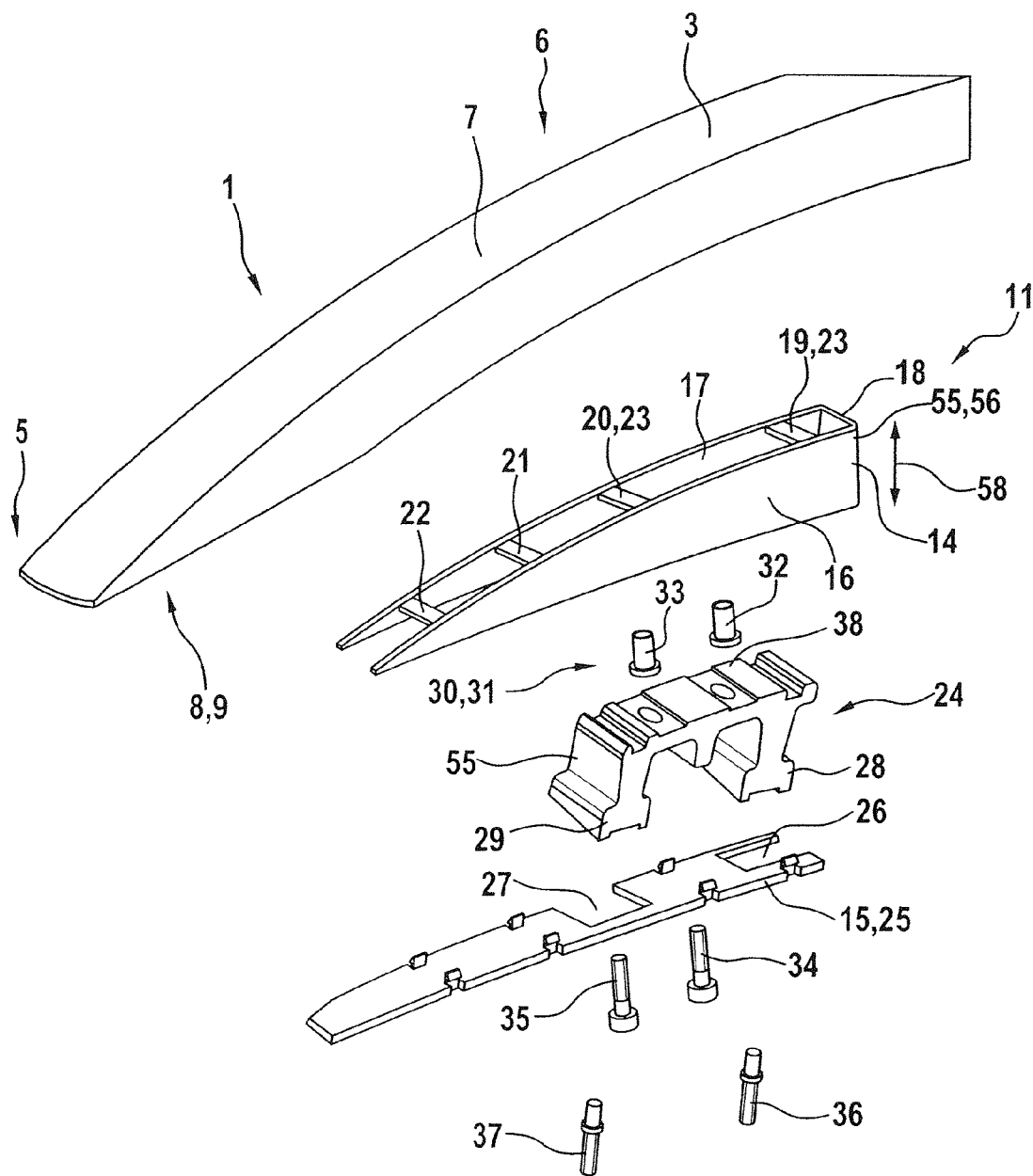
FIG. 1b shows individual components of the roof rail in the region of an end thereof.

FIG. 1b shows individual components of the roof rail 1 in an end region 6. The curved portion 7 of the rack bar 3 can be seen. The cover 11 is in the form of a cover element 14 and a base element 15 can be associated therewith. The cover element 14 is U-shaped—when viewed as a longitudinal section—and has two side walls 16 and 17 and a front wall 18 which connects the two side walls 16 and 17. The inner sides of the side walls 16 and 17 are connected to each other via webs 19, 20, 21 and 22. The webs 19 and 20 each form a fixing region 23 for fixing the cover 11. This will be discussed in greater detail below. FIG. 1b further shows the support element 24 which is located inside the cover 11 in particular for the most part in the assembled state of the roof rail 1. The base element 15 associated with the cover 11 is in the form of a base plate 25 and is located—in the assembled state of the roof rail 1—in the lower region of the cover 11, between the side walls 16 and 17, wherein it has openings 26 and 27 which are particularly in the form of peripherally open recesses and through which feet 28 and 29 of the support element 24 extend. FIG. 1b further shows two screwed connections 30 and 31 each comprising a rivet nut 32 and 33 and a threaded screw 34 and 35, respectively. FIG. 1b further shows two threaded/collared bolts 36 and 37 which serve to fix the roof rail 1 on the roof (not illustrated in FIG. 1b) of the motor vehicle.

As can be seen in the side view of FIG. 2, the feet 28 and 29 of the support element 24 project at least partially downward out of the cover 11. It can be seen that the feet 28 and 29 are positioned on the roof of the vehicle with the lower sides thereof, that is to say, the lower sides are flush with the roof contour line 2. The remaining gap between the roof contour line 2 and the roof rail 1 is filled with a spacer which is not illustrated and which is of film-like form and is arranged between the roof rail 1 and the vehicle roof. Alternatively, it is also possible for the cover 11 to be constructed so as to be longer in a downward direction, that is to say, it covers the feet 28 and 29. According to another alternative, the configuration is also conceivable wherein the feet 28 and 29 are introduced into recesses of the roof of the motor vehicle in such a manner that the lower side of the cover 11 and the roof application end 9 of the rack bar 3 are now positioned on the roof of the vehicle. Naturally, it is also possible in this instance to interpose a thin spacer.

FIGS. 3 to 6 show more detailed embodiments of the roof rail 1 according to the invention in the fixing region. According to FIG. 3, it can be seen that the support element 24 is fixed to the rack bar 3 by means of the screwed connections 30 and 31. By the screwed connections 30 and 31 being tightened, the upper side 38 of the support element 24 is clamped against the lower side 4 of the rack bar 3. Threaded holes 39 and 40 in which the threaded/collared bolts 36 and 37 are threaded in such a manner that the respective collar of the threaded/collared bolts 36 and 37 abuts the associated lower side of the respective one of the feet 28 and 29. The still-protruding threaded region of each threaded/collared bolt 36, 37 is inserted into corresponding receiving holes in the roof of the motor vehicle and fixed to the motor vehicle by means of nuts or the like.

FIG. 4 supplements the illustration of FIG. 3 in that the cover 11 is illustrated in addition therein. The rack bar 3 is not illustrated in FIG. 4. The two screwed connections 30 and 31 are shown in FIGS. 3 and 4 in the screwed state.

It can be seen in FIG. 5 that—in the assembled state—the support element 24 is inside the cover 11, that is to say, the width b of the support element 24 is smaller than the inner width c of the cover 11 between the inner sides of the side walls 16 and 17. The width d of the rack bar 3 which is not illustrated in FIG. 5 is indicated with broken lines 40' and 41. It can be seen that this width d is greater, in particular considerably greater, than the outer width e of the cover 11. In this regard, d is greater than e, e is greater than c and c is greater than b. It can further be seen in FIG. 5 that—when viewed in the longitudinal extent of the rack bar 3—the support element 24 extends only over a partial longitudinal extent of the cover 11, that is to say, does not extend as far as a location in the spandrel tip region 42.

Figure 6:
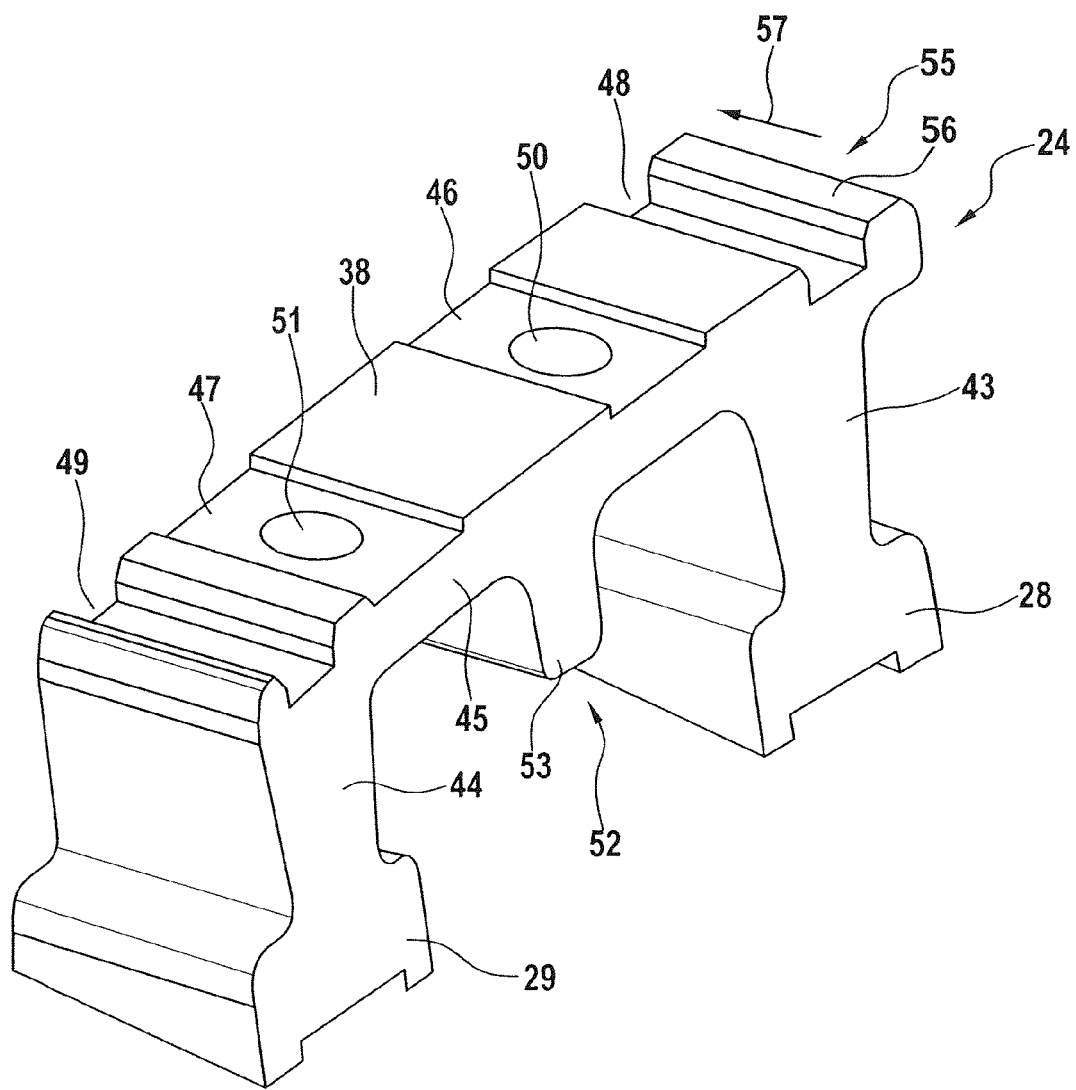
FIG. 6 is a three-dimensional view of the support element.

FIG. 6 is a perspective view of the support element 24. It is constructed in a bridge-like manner and therefore has two columns 43 and 44 which have the feet 28 and 29 in the lower region. The two columns 43 and 44 are connected via a connection web 45 which has at the upper side 38 thereof two grooves 46 and 47 for portions of the screwed connections 30 and 31 and two grooves 48 and 49 which are in the form of peripherally open recesses 48' and 49' for the fixing region 23 of the cover 11. Fixing holes 50 and 51 are located in the grooves 46 and 47. A downwardly projecting support wall 53 is formed at the lower side 52 of the connection web 45.

According to FIG. 6, the support element 24 forms a separate component 55 of the roof rail 1, which component comprises an aluminum alloy and is produced using the extrusion method, that is to say, it is an extrusion component 56. The extrusion direction is indicated in FIG. 6 by means of an arrow 57. Since the lower side of the feet 28 and 29 extends obliquely—as a result of the roof contour of the vehicle roof—a corresponding mechanical processing operation of the support element 24 is carried out after the extrusion production operation. Naturally, the fixing holes 50 and 51 must also be produced then. The support element 24 is integrally formed.

According to FIG. 1b, the cover 11, that is to say, the cover element 14, is a separate component 55 of the roof rail 1. The cover 11 comprises an aluminum alloy. The cover is an extrusion component 56, wherein the extrusion direction is indicated with the arrow 58. Since—as FIG. 1b shows—the webs 19 to 22 do not extend over the entire height of the cover 11, they are—after the extrusion operation—mechanically shortened accordingly. The cover 11 is integrally formed. The cover 11 is particularly constructed as a hollow profile-member.

According to FIG. 1a, the rack bar 3 is a separate component 55 of the roof rail 1. The rack bar 3 comprises an aluminum alloy and is preferably constructed as a hollow profile-member. The rack bar 3 is produced using the extrusion method and is therefore an extrusion component 56, wherein the extrusion direction is indicated in FIG. 1a by means of an arrow 59. After the extrusion, a corresponding bending of the rack bar is optionally carried out in the region between the end regions 6 thereof in order to adapt to the roof contour line 2 of the corresponding vehicle. The bent end regions 6 are further produced after the extrusion operation. The rack bar 3 is integrally formed. Alternatively, a multiple-piece, assembled formation is also possible.

According to FIG. 1b, the base element 15 is produced with the plastics injection-molding method and, consequently, it comprises plastics material. The base element 15 is preferably integrally formed. Alternatively, it may comprise aluminum or an aluminum alloy.

Figure 7:
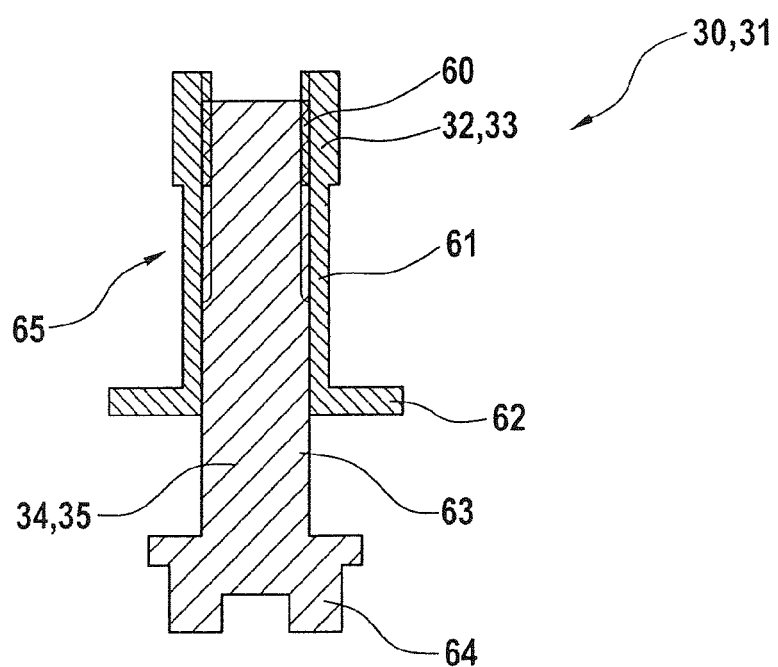
FIGS. 7 and 8 show a screwed connection for fixing the support element to the rack bar.
Figure 8:
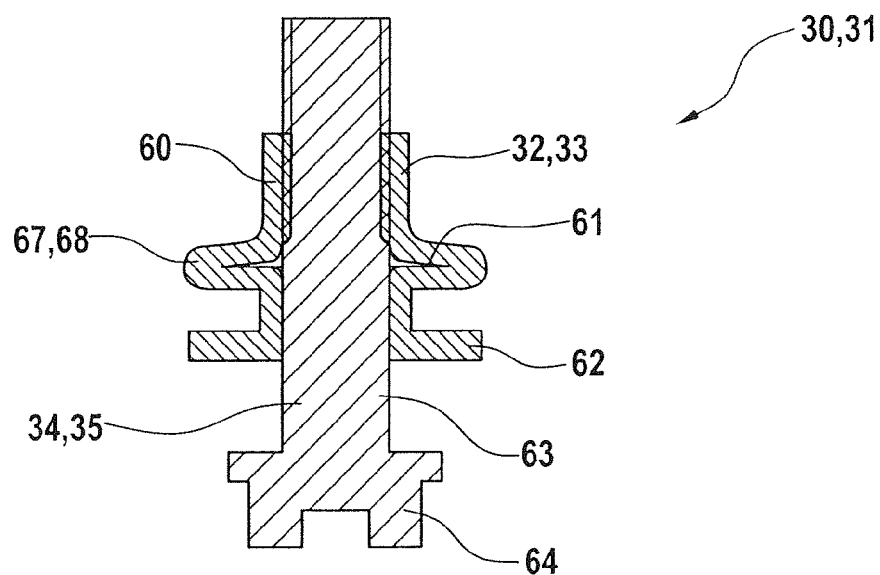

FIGS. 7 and 8 illustrate the screwed connections 30 and 31 in two different states as follows: FIG. 7 shows the non-tightened state and FIG. 8 shows the tightened state. It can be seen that the rivet nut 32, 33 according to FIG. 7 has a threaded region 60, which a deformation region 61 which terminates with a collar 62 adjoins. The threaded screws 34 and 35 have a threaded shaft 63 and a head 64. The threaded region 60 and deformation region 61 form a fixing region 65. During the assembly of the roof rail 1, a rivet nut 32, 33 is inserted from the outer side into a hole 66 (FIG. 3) at the lower side of the rack bar 1 which is in the form of a hollow profile-member in order to produce the screwed connections 30 and 31, respectively, so that the collar 62 abuts the lower side 4 of the rack bar 3. Furthermore, a threaded screw 34, 35 extends through the fixing holes 50, 51 of the support element 24 and the end of the threaded shaft 63 is screwed into the threaded region 60 of the associated rivet nut 32, 33 according to FIG. 7. If a tool, for example, a screwdriver, is now positioned on the head 64 and the screwed connection 30, 31 tightened, the deformation region 61 of the associated rivet nut 32, 33 becomes deformed into a state as may be seen in FIG. 8, that is to say, the deformation region 61 is formed into a bead 67 which forms a flange 68 which is supported on the inner side of the wall of the hollow profile-member of the rack bar 3. As a result, the rivet nut 32, 33 is fixed to the rack bar 3 and it is therefore possible to clamp the support element 24 and rack bar 3 to each other according to FIG. 3. That clamped state is also clearly apparent in FIG. 9.

Figure 9:
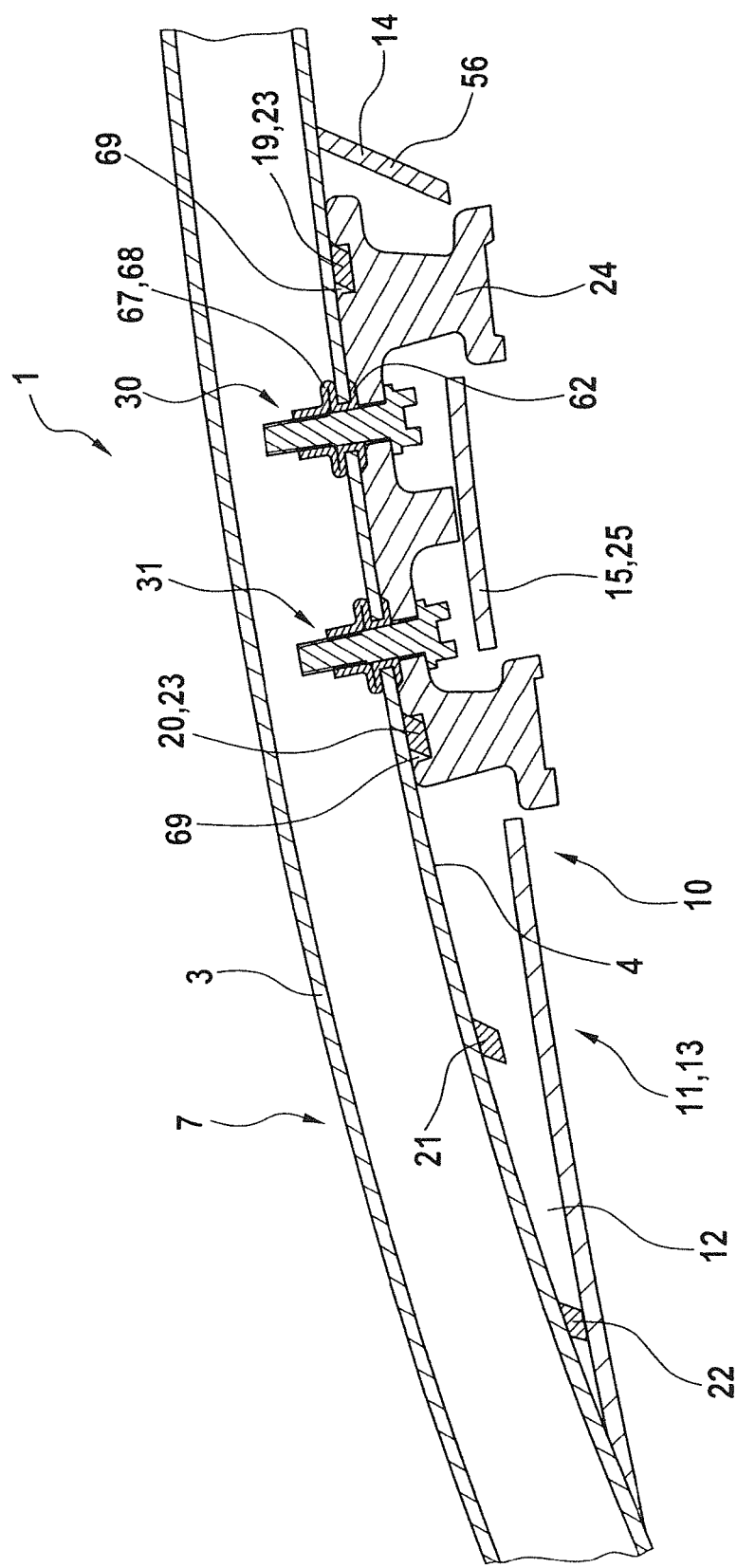
FIG. 9 is a longitudinal section of the roof rail in the end region according to a first embodiment.

FIG. 9 is a longitudinal section through the roof rail 1 in the fixing region. In order to join together the various components of the roof rail 1, the following is carried out. As already described, the two rivet nuts 32 and 33 are inserted into the holes 66 of the rack bar 3 and the two threaded screws 34 and 35 are inserted into the fixing holes 50 and 51. Furthermore, the support element 24 is introduced—from below—into the interior of the cover element 14 in such a manner that—as can be seen in FIG. 9—the two webs 19 and 20 which form the fixing regions 23 are positioned in the grooves 48 and 49 of the support element 24. Naturally, it is also possible to fit the cover element over the support element 24 or to move both the cover element 14 and the support element 24 toward each other. The important aspect is, however, that—as mentioned—the two fixing regions 23 are positioned in the grooves 48 and 49. The two screwed connections 30 and 31 are now tightened, whereby the situation according to FIG. 9 is produced, that is to say, the support element 24 and rack bar 3 are clamped to each other, wherein the rivet nuts 32 and 33 are moved into the riveted state thereof. As a result of the support element 24 and rack bar 3 being clamped, the fixing regions 23 of the cover 11 are retained between the support element 24 and the rack bar 3, in particular clamped between those components, whereby the cover 11, that is to say, the cover element 14, is securely retained. Consequently, the inner spaces of the grooves 48 and 49 each form a gap 69 which retains, in particular retains in a clamping manner, the fixing region 23. The upper sides of the remaining webs 21 and 22 are preferably supported in the mounted state of the roof rail 1 on the lower side 4 of the rack bar 3 as can be seen in FIG. 9. Alternatively, it is also possible for the riveting of the rivet nuts 32, 33 to be carried out before the connection of the components of the roof rail 1 by means of a special device. The base element 15 is now introduced into the interior of the cover element 14 in such a manner that the two feet 28 and 29 are directed out of the openings 26 and 27 according to FIG. 9, wherein the lower side of the plate-like base element 15 is flush with the lower edge of the cover element 14. Overall, the situation according to FIG. 9 thus results.

Figure 10:
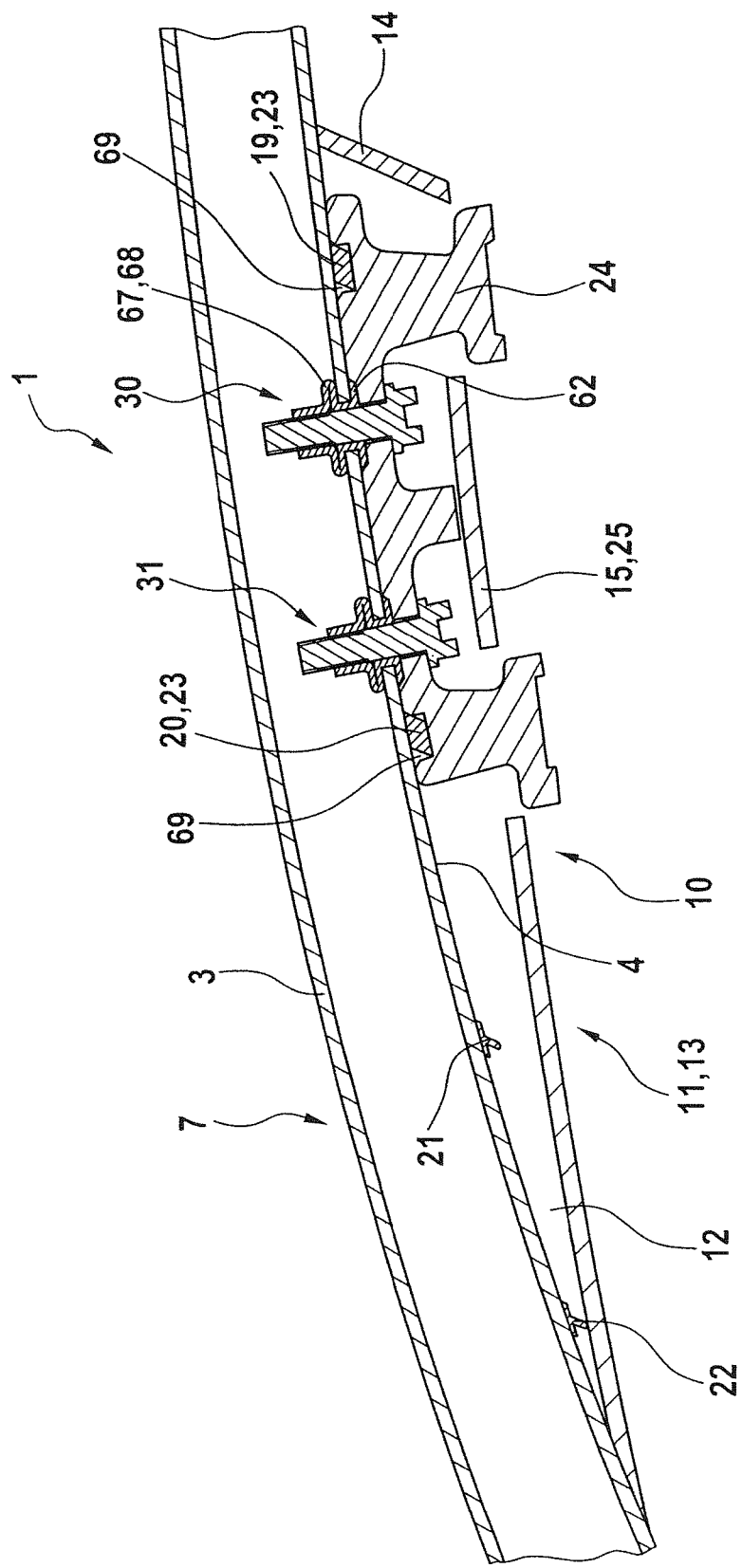
FIG. 10 is a longitudinal section of the roof rail in the end region according to a second embodiment.
Figure 11:
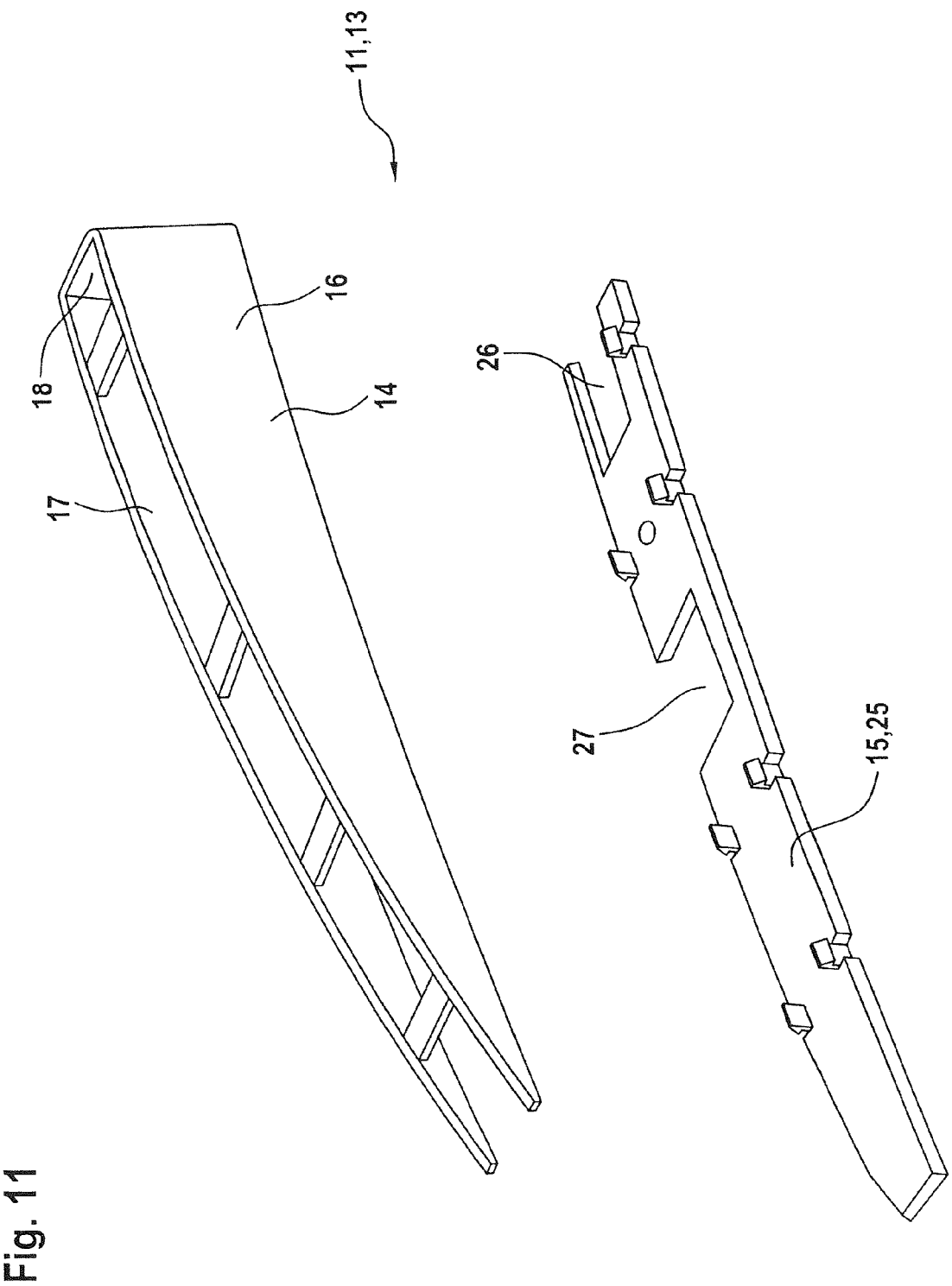
FIG. 11 shows the cover of the roof rail in the disassembled state.

In FIG. 9, the cover element 14 is produced using the extrusion method and it is therefore an extrusion component 56. FIG. 10 shows another embodiment so that only the differences existing in relation to FIG. 9 are intended to be discussed below. In the embodiment of FIG. 10, the cover element 14 of the cover 11 is not produced with the extrusion method, but instead an injection-molded plastics component 75 is involved, which can be seen in particular in that the webs 21 and 22 cannot be produced with the extrusion method as a result of the T-shaped cross-sectional contour thereof. Such a plastics component is preferably provided in another operating step with a surface coating in order to provide a visual adaptation of the color with respect to the rack bar 3 which comprises aluminum or an aluminum alloy.

Figure 12:
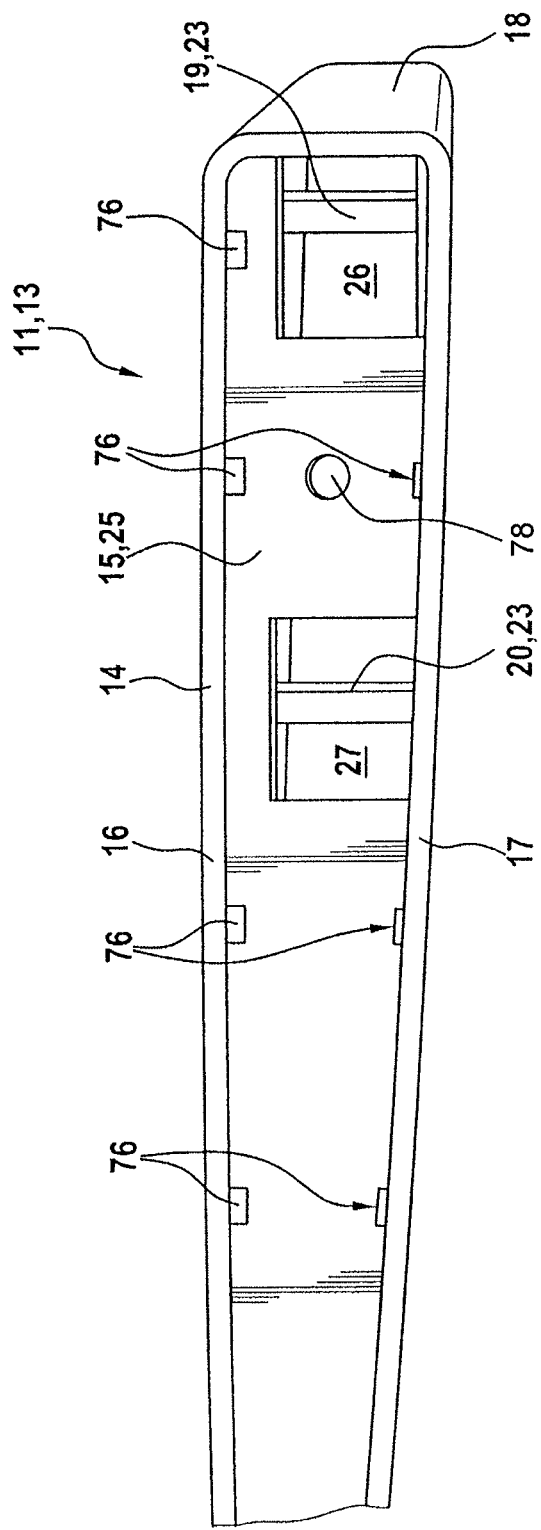
FIG. 12 is a bottom view of the cover of the roof rail and FIGS. 13 and 14 are cross sections through the roof rail in the fixing region according to another embodiment.
Figure 13:
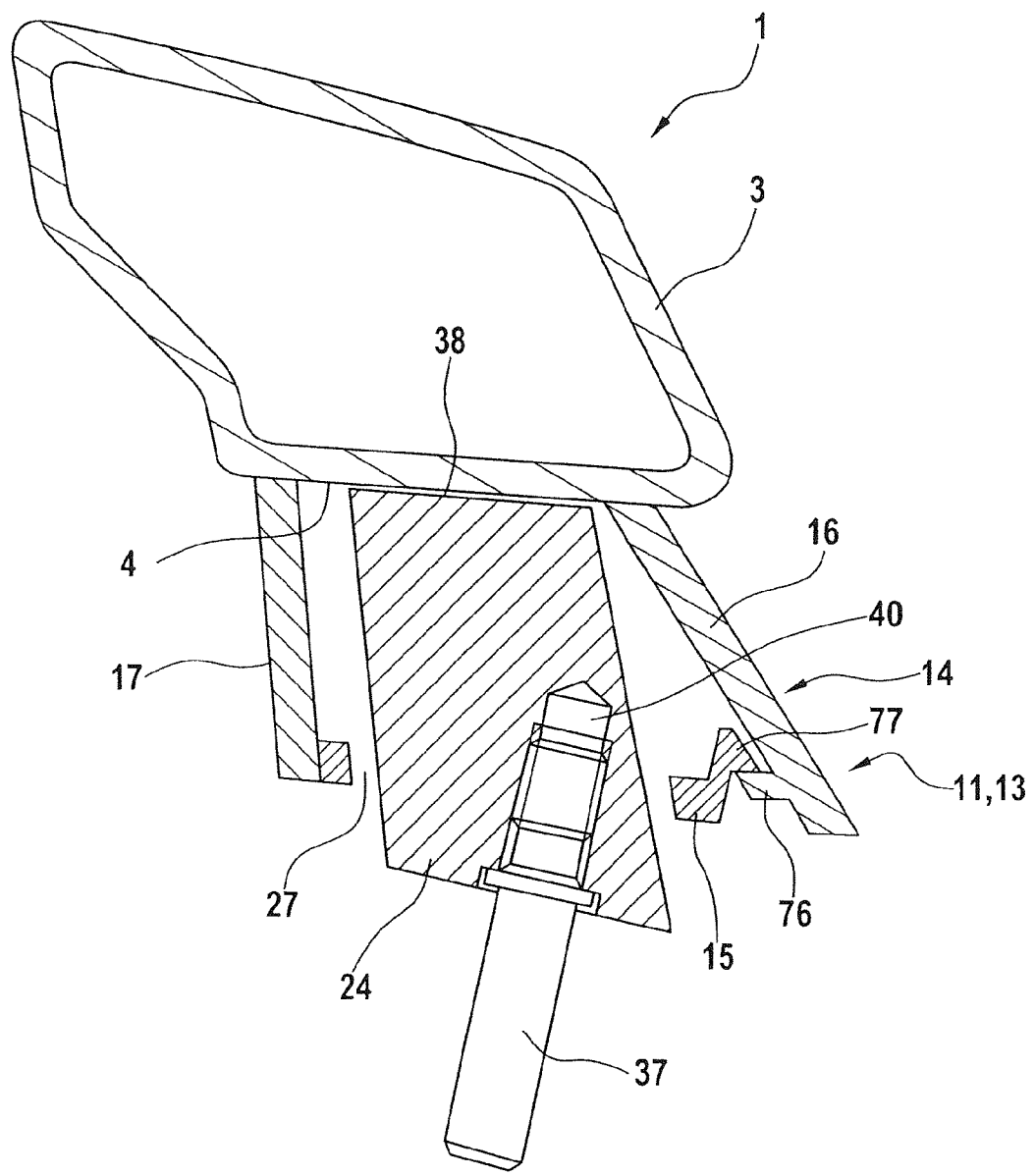
Figure 14:
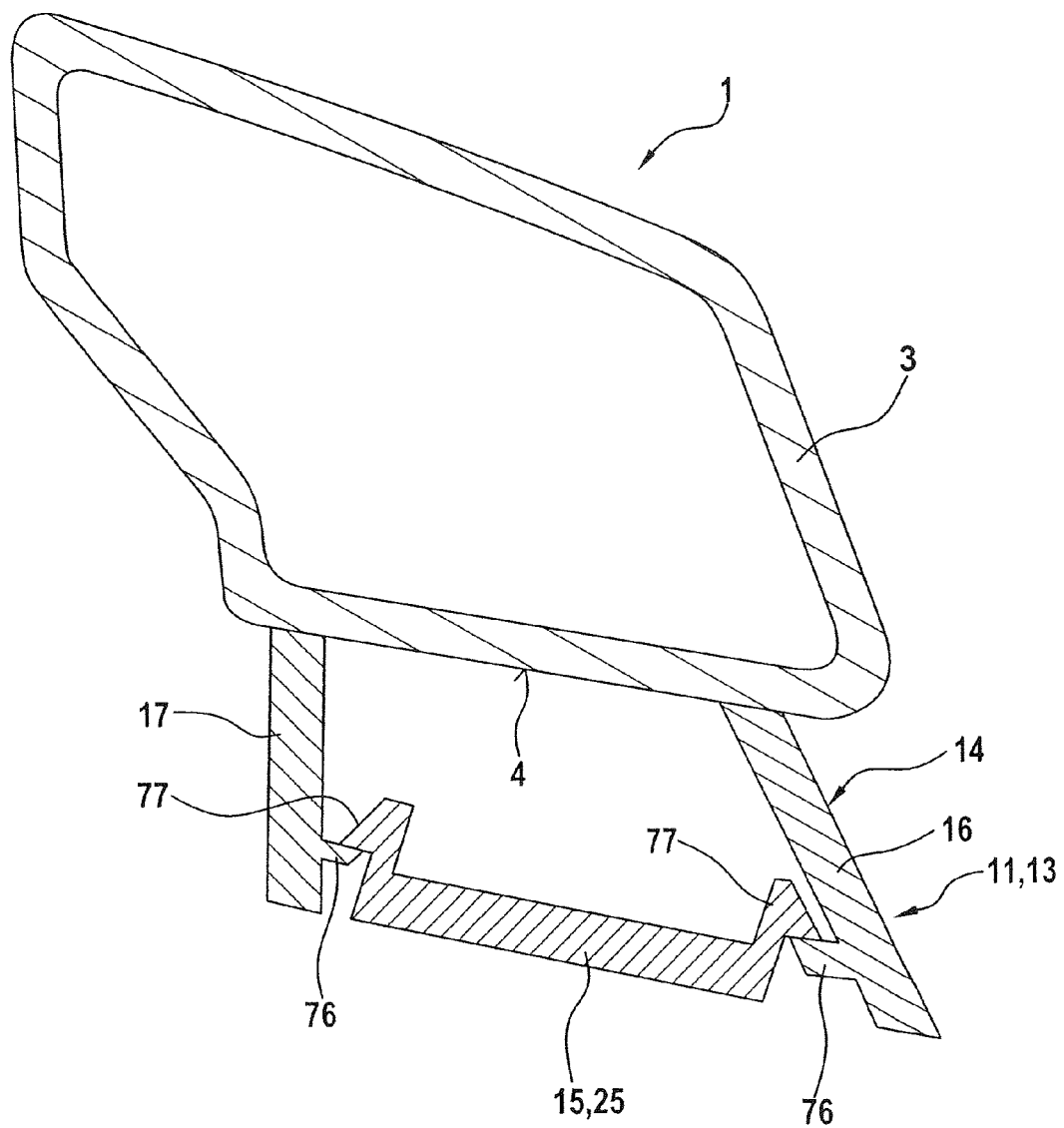

FIG. 12 is a bottom view of the cover 11, wherein the base element 15 is clip-fitted into the interior of the cover element 14. That clip-fitting state can be clearly seen in FIGS. 13 and 14. However, the clip-fitting is only possible if the cover 11 is not produced with the extrusion method but is instead produced in a different manner, in particular as an injection-molded component or diecast component or injection-molded plastics component, because there are formed on the inner side of the side walls 16 and 17 retention projections 76 which are engaged behind by catch projections 77 of the base element 15 in an engaging manner, whereby the base element 15 is retained on the cover element 14 in that manner. The FIGS. 13 and 14 also clearly show that the rack bar 3 is in the form of a hollow profile-member. It can further be seen in FIG. 13 that the longitudinal extent of the threaded/collared bolt 37 extends obliquely relative to the side faces of the support element 24. That angle formed in that manner is dependent on the individual roof contour line 2 of the roof of the motor vehicle.

It should be noted that the grooves 46 and 47 of the support element serve to receive the collars 62 of the rivet nuts 32 and 33. The base element 15 is further provided with a fixing hole 78 (FIG. 12) in order to receive a fixing element for a spacer which can be arranged between the roof rail 1 and the vehicle roof. The fixing element particularly also produces a connection with respect to the vehicle roof. It may preferably be secured/acted on by the support wall 53 of the support element 24. In that manner, the base element 15 can also alternatively be fixed to the vehicle before the remaining components of the roof rail 1 are assembled.

As a result of the extruded configuration of the support element 24, it is possible to produce—for example, with respect to a forged component—a lighter structural type, in particular approximately 60% lighter, which may result in a weight reduction of approximately 0.5 kg per vehicle. Furthermore, as a result of the structural type according to the invention, there is produced a support 24 which is constructed so as to be very narrow, in particular narrower or substantially narrower than the width dimension of the rack bar, which can preferably be seen in FIG. 13, which also results in a weight reduction, and also visual advantages. If the cover 11, in particular the cover element 14, is produced from injection-molded plastics material, it must be painted in order to be substantially adapted to the visual coloring of the rack bar 3. The same also applies if the cover 11, in particular the cover element 14, is formed from plates which, for example, also comprise aluminum or aluminum alloy, wherein there is then still produced, however, in relation to the rack bar 3, a visual discrepancy which can clearly be perceived in direct comparison because such plates have slightly different alloy constituents with respect to the material of the rack bar 3. That visual discrepancy may be disruptive. If the cover 11, in particular the cover element 14, is produced as an extrusion profile-member from aluminum or aluminum alloy in the same manner as the rack bar, however, exactly the same alloy composition results, as does a precisely identical coloring, irrespective of whether polishing to a high sheen or a matt polishing is carried out and/or whether anodizing is carried out. That exactly identical appearance is advantageous. Extrusion alloys which may be considered for the mentioned components, in particular the rack bar 3, cover element 14 and/or support element 24, preferably include AlMgSi 0.5, Al 99.85 or Al 99.9. They are anodizable materials. Furthermore, a high level of strength is produced for the support element 24 with the materials mentioned.

The invention claimed is:

1. A roof rail configured to be fixed to a roof of a motor vehicle, having at least one rack bar and having at least one support element, which is fixed to the rack bar for bridging a spacing which is formed between the rack bar and the roof of the motor vehicle and for fixing the roof rail to the roof of the motor vehicle, and having at least one cover for the at least one support element, wherein the rack bar, the at least one support element, and the at least one cover are formed as separate components, at least one end region of the rack bar is in the form of a bent portion whose front end forms a roof application end, the at least one support element is formed by an extrusion process, the at least one support element and the at least one cover are located at least partially in the region of the bent portion, the at least one cover has at least one fixing region which is retained, to fix the at least one cover, in at least one gap formed between the rack bar and the at least one support element, and the retention of the at least one fixing region brought about in the at least one gap is carried out without fixing means.

2. The roof rail according to claim 1, wherein a spandrel is formed between the at least one end region of the rack bar and a roof contour line of the roof, and the at least one cover is in the form of a spandrel cover which extends as far as a location in a spandrel tip.

3. The roof rail according to claim 1, wherein the at least one cover has an approximately triangular contour in a side view of the roof rail.

4. The roof rail according to claim 1, wherein the at least one fixing region is retained in the at least one gap between the rack bar and the at least one support element only by guiding together the rack bar and the at least one support element, which guiding is carried out to fix the rack bar and the at least one support element to each other.

5. The roof rail according to claim 1, wherein the retention of the at least one fixing region brought about in the at least one gap is carried out by a positive-locking action and/or by a clamping action which is present between the rack bar and the at least one support element.

6. The roof rail according to claim 1, wherein the rack bar is supported directly on the at least one support element in at least at one location beside the at least one gap.

7. The roof rail according to claim 1, wherein the at least one gap is formed by at least one peripherally open groove of the rack bar and/or the at least one support element.

8. The roof rail according to claim 1, wherein the rack bar, the at least one support element and/or the at least one cover are each constructed integrally.

9. The roof rail according to claim 1, wherein the rack bar and/or the at least one cover are formed by an extrusion process.

10. The roof rail according to claim 1, wherein the rack bar and/or the at least one cover are each formed by an injection molding process and/or by a diecasting process.

11. The roof rail according to claim 1, wherein the rack bar, the at least one support element and/or the at least one cover each comprise aluminum or an aluminum alloy.

12. The roof rail according to claim 1, wherein the fixing of the at least one support element to the rack bar is brought about by means of at least one screwed connection.

13. The roof rail according to claim 1, wherein the rack bar, the at least one support element and/or the at least one cover are each in the form of a hollow profile-member.

14. The roof rail according to claim 12, wherein the at least one screwed connection has a rivet nut, which is riveted by tightening the at least one screwed connection and which is associated with the rack bar, and the at least one support element has at least one fixing hole, through which a threaded screw which is screwed into the rivet nut extends.

15. The roof rail according to claim 1, wherein at least one planar base element is associated with the at least one cover.

16. The roof rail according to claim 1, wherein the at least one planar base element has at least one opening, through which at least one foot of the at least one support element extends.

17. The roof rail according to claim 1, wherein the at least one planar base element is retained on the at least one cover by means of a clip-fit action and/or a clamping action.

* * * * *